Jan. 18, 1938.                 M. ORLOVE                 2,105,624
                              WATER POWER
                       Original Filed Oct. 30, 1936
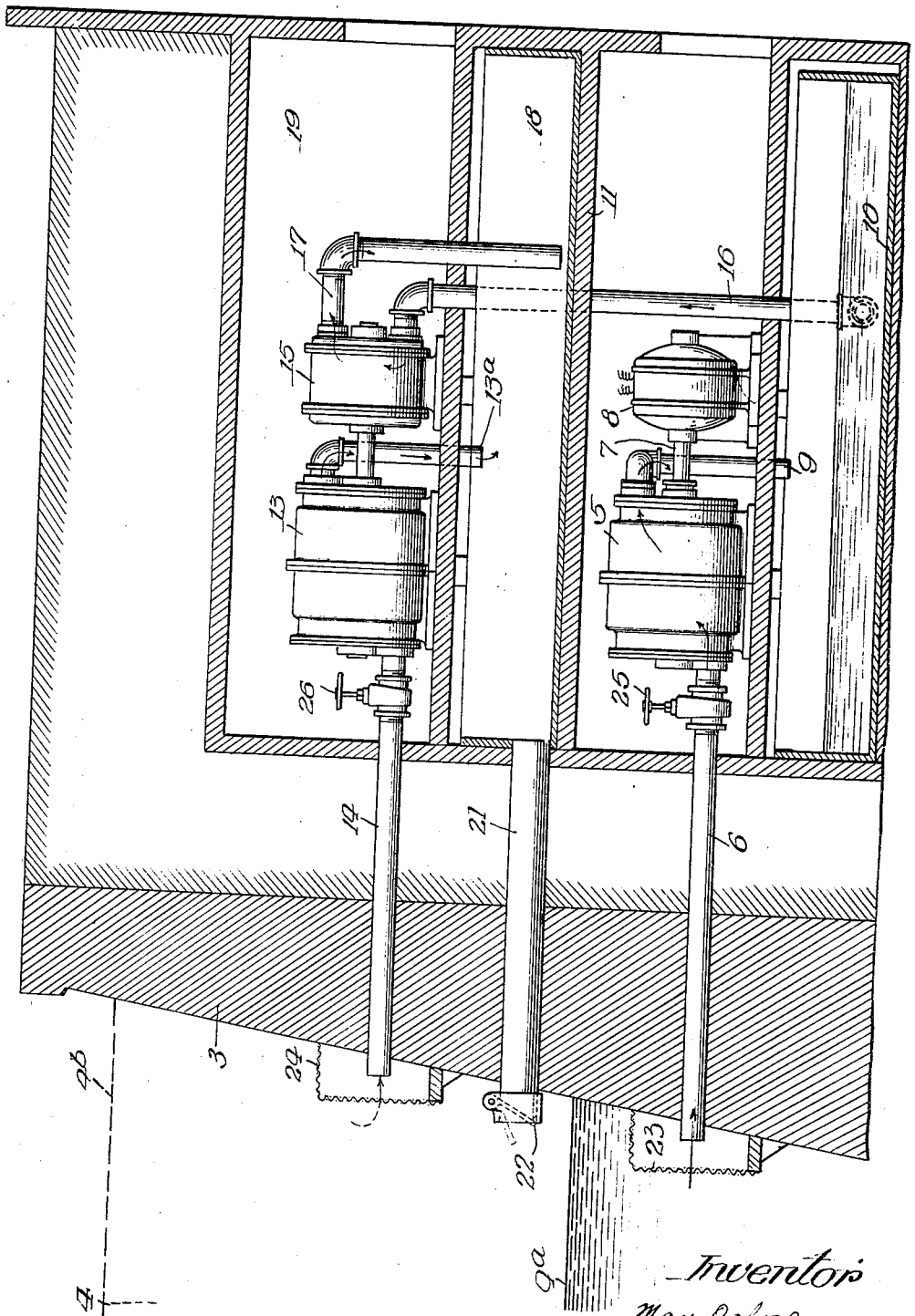
Inventor
Max Orlove
By Fred Gerlach his Atty Patented Jan. 18, 1938

2,105,624

UNITED STATES PATENT OFFICE 2,105,624

WATER POWER

Max Orlove, Washington, D. C.

Application October 30, 1936, Serial No. 108,357
Renewed December 6, 1937

7 Claims. (Cl. 60—55)

The invention relates to a method of and apparatus for developing power from water-power.

One object of the invention is to provide improved apparatus for operating a power generator by water under pressure derived from a low level such, for example, as below low tide, and whereby the water at a higher level will be utilized for pumping or lifting the water used for driving the generator to discharge it by gravity. This makes it possible to drive the generator constantly by water and to intermittently remove the water used for driving the generator during such times as the water level is sufficiently high for pumping the water for that purpose. This economically achieves water-power development.

Another object of the invention is to provide an improved method of developing electrical power generated from water-power.

Other objects of the invention will appear from the detailed description of the invention.

The drawing is a vertical section illustrating the invention in connection with a body of water subject to tides.

Wall 3 indicates the embankment for a body of water 4 which is subject to tide changes, the low tide level being indicated at 4ª and the high tide level at 4ᵇ. A turbine 5 has connected thereto an intake pipe 6 which communicates with the body of water 4 sufficiently below low tide level so that the turbine will at all times be operative by water under hydrostatic pressure. This turbine 5 may be of any conventional type which is adapted to be driven by water under pressure. The rotor of turbine 5 is connected by a shaft 7 to drive an electric generator 8 which is adapted to generate electric current for distribution to any suitable point and for any desired use. Turbine 5 is provided with an outlet pipe 9 which discharges the water from the turbine into a receiver or reservoir 10. The turbine 5 and generator 8 may be located in a chamber 11 and are disposed sufficiently below low tide level to cause the turbine to be driven by water flowing from the body of water 4 through pipe 6 at all times. The reservoir 10 may be of any suitable type and is of sufficient capacity to hold the water from the turbine 5 between the intermittent removal cycles hereinafter set forth.

Turbines 13, in the desired number, are each adapted to be driven by water from the body 4. Each is provided with an intake pipe 14 which is open to the body of water 4 intermediate the high and low tide levels. A rotary water pump 15 is driven by each turbine 13 and has an intake 16 which communicates with the receiver 10 and a discharge pipe 17 which delivers the water from the pump into a storage reservoir 18. Each turbine 13 is operative by water under hydrostatic pressure from the body of water 4 at all times when the level is sufficiently high to drive the turbine 13 and pump 15. Turbines 13 and pumps 15 are installed in a chamber 19 built in the bank below ground level. The discharge from turbines 13 is through pipes 13ª, respectively. The turbines 13 are alike in construction and operation and placed side-by-side in the chamber, only one being shown. Reservoir 18 is located intermediate the chambers 11 and 19 and is provided with an outlet pipe 21 through which the water from reservoir 18 will be discharged by gravity during the low tide periods and when the water level is below said outlet. A check valve 22 is provided at the discharge end of pipe 21 to automatically close the pipe against the ingress of water whenever the tide-level is above the pipe 21 and to automatically permit the water to flow out of reservoir 18 when the tide falls below the pipe 21. A screen 23 is provided around the inlet end of pipe 6 and a screen 24 is provided around the intake pipe 14 to prevent solid matter from entering said pipes. A valve 25 is included in intake pipe 6 to permit the turbine 5 to be stopped. A valve 26 is included in intake pipe 14 to permit turbine 13 to be stopped.

Pumps 15 are sufficient in number and have sufficient aggregate pumping capacity for lifting the accumulation of water in the receiver 10 during the continuous run of turbine 5 into the reservoir during the shorter high tide periods during which turbines 13 are operative. Turbines 13 and pumps 15 are all of the same construction and, for that reason, it has not been deemed necessary to illustrate a number of them. The capacity of the receiver 10 must be sufficient to hold the water from the constantly operated turbine 5 during the idle periods of the pumps 15. The capacity of the pumping apparatus is sufficient to remove the water from receiver 10 and deliver it into the reservoir 18 during the operative periods of the pumping apparatus which are limited to the periods when the tide level is sufficiently above turbines 13 to provide sufficient pressure for their operation. The capacity of reservoir 18 is sufficient to retain the water used for the intermittent operation of the turbines 13 and the accumulation of water lifted by the pump 15 from the receiver 10. The outlets 21 of reservoir 18 are of sufficient capacity to empty the reservoir by gravity during the low tide cycles during which the outlet 21 is free to discharge water by gravity.

The operation of the apparatus and the method of developing power is as follows: At all times during high, low and intermediate tides, the hydrostatic pressure of the body of water 4 will operate the turbine 5 and drive the generator 8 to generate electric current for power or other use. During low tide the water discharged from the turbine 5 will accumulate in receiver 10 and the pumps 15 will be idle. When the tide rises to a point sufficiently above the intake pipe 14 to operate turbines 13 to drive them and pumps 15, they will be operated and lift the water from receiver 10 into the reservoir or storage chamber 18. At this time the check valve 22 will be closed to prevent the inflow of water from the body 4 into reservoir 18. While the tide level is above the turbines 13 the water will be pumped from receiver 10 to the reservoir 18. When the tide level falls below that necessary for the operation of turbines 13 and pumps 15, they will stop and the water discharged from turbine 5 will accumulate in reservoir 10. As the tide falls below the discharge pipe 21 for the reservoir 18 the check valve 22 automatically will open and all the water from reservoir 18 will be quickly returned to the body of water 4 by gravity. In this method the generator will be driven continuously by the water-driven turbine because it is disposed sufficiently below low-tide level to remain operative at all times. The water used for operating the power turbine will be collected in the receiver during the cycles when the pumps are idle during low tide periods. The pumping apparatus will be operative during high-tide periods for delivery into the reservoir which receives the water used for both turbines, for its intermittent discharge during the low-tide levels. The cycle of operations before described will be repeated with each tide change between high and low levels.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus for generating power, the combination of a water-propelled unit disposed at a low level of a body of water and adapted for constant operation by water-pressure from said level, a power generator driven by said water-propelled unit, a receiver below the unit for the water discharged therefrom, water-pumping means operated by power derived from a higher level of said body for elevating water from the reservoir, and means for storing the water from the pumping means and discharging it by gravity.

2. In apparatus for generating power, the combination of a water-propelled unit disposed at a low level of a body of water and adapted for constant operation by water-pressure from the low level, a power generator driven by said water-propelled unit, a reservoir below the unit and adapted to receive the discharge therefrom, water-pumping means operated by power derived from a higher level of said body for elevating the water from the reservoir, and means for storing the water from the pumping means, and discharging it by gravity at a level intermediate the water-propelled unit and the pumping means.

3. In tide water apparatus for generating power, the combination of a water-propelled unit provided with an intake and operable by water below and above and at low tide level, a receiver below the unit for receiving the water discharged therefrom, a power generator driven by said unit, water-propelled means provided with an intake and operable by the water at a level intermediate the low and high tide levels, pumping means operative by the water-propelled means, for elevating the water from the receiver, and storage means for the water from the pumping means, provided with an outlet for discharging water by gravity.

4. In tide water apparatus for generating power, the combination of a water-propelled unit provided with an intake and operable by water below the low tide level, a receiver below the unit for receiving the water discharged therefrom, a power generator driven by said unit, water-propelled means provided with an intake and operable by the pressure of water at a level intermediate the low and high tide levels, pumping means operative by the water-propelled means, for elevating the water from the receiver, and storage means for receiving the water from the pumping means, provided with an outlet adapted to discharge water by gravity at a level intermediate the low-tide level and the level of the intake for the water-propelled means for the pumping means.

5. The method of generating power from a body of water, which consists in continuously driving a unit for power generation by water from the said body below a relatively low level, lifting the water discharged from the unit by water under pressure from a higher level and discharging the water used for driving the power unit and the lifting of the water at a level intermediate the said low and high levels.

6. The method of generating power from a body of water, which consists in continuously driving a unit for power generation by water from the said body below a relatively low level, intermittently lifting the water discharged from the unit by water under pressure from a higher level and discharging the water used for driving the power unit and the lifting of the water at a level intermediate the said low and high levels.

7. The method of generating power from a body of water subject to tide changes, which consists in constantly driving a unit for power generation by water from the said body below the low tide level, storing the water used for driving said unit, lifting the water discharged by the unit by power from water-pressure at a level intermediate the high and low tide levels, storing the lifted water and that used for lifting and intermittently discharging the stored water by gravity at a level intermediate the high and low levels.

MAX ORLOVE.